(12) United States Patent
Dupuy

(10) Patent No.: US 6,546,025 B1
(45) Date of Patent: Apr. 8, 2003

(54) METHOD AND DEVICE FOR TRANSMITTING DATA FRAMES

(75) Inventor: Pierre Dupuy, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/184,254

(22) PCT Filed: Feb. 23, 1998

(86) PCT No.: PCT/FR98/00352

§ 371 (c)(1),
(2), (4) Date: Jan. 27, 1999

(87) PCT Pub. No.: WO98/39874

PCT Pub. Date: Sep. 11, 1998

(30) Foreign Application Priority Data

Mar. 3, 1997 (FR) .............................................. 97 02507

(51) Int. Cl.$^7$ .................................................. H04J 3/06
(52) U.S. Cl. ....................... 370/509; 370/510; 370/512; 714/752; 714/746
(58) Field of Search ............................... 370/509, 510, 370/512, 514, 506, 513, 511, 503; 375/365, 366, 354, 368; 714/746, 752, 701, 744, 797; 709/227, 337

(56) References Cited

U.S. PATENT DOCUMENTS

| 5,420,865 A |   | 5/1995  | Swanbery           |
|-------------|---|---------|--------------------|
| 5,490,147 A | * | 2/1996  | Kubo ........... 370/509 |
| 5,623,602 A | * | 4/1997  | Nakahisma ...... 709/235 |
| 5,675,585 A | * | 10/1997 | Bonnot .......... 714/701 |
| 5,687,199 A | * | 11/1997 | Dupuy ........... 375/354 |
| 5,822,328 A | * | 10/1998 | Derby ........... 370/507 |
| 5,875,062 A | * | 2/1999  | Dupuy ........... 375/368 |
| 5,956,377 A | * | 9/1999  | Lang ............ 375/372 |
| 6,137,810 A | * | 10/2000 | Bjurel .......... 370/509 |
| 6,256,326 B1| * | 7/2001  | Kudo ............ 370/512 |

FOREIGN PATENT DOCUMENTS

| DE | 27 39 978 A1 | 3/1979 |
| EP | 0 367 215 A2 | 5/1990 |
| EP | 0 426 894 A1 | 5/1991 |

OTHER PUBLICATIONS

Patent Abstracts of Japan, vol. 009, No. 288 (E–358), Nov. 15, 1985 corresponding to JP 60 128752 A, Jul. 9, 1985.

* cited by examiner

Primary Examiner—Douglas Olms
Assistant Examiner—Ricardo M. Pizarro
(74) Attorney, Agent, or Firm—Sughrue Mion, PLLC

(57) ABSTRACT

The method has two possible transmission modes: a first mode whereby a first transmitter (1) sends frames including sufficient auxiliary data to enable a first receiver (2) to acquire frame synchronization in a reliable fashion, said auxiliary data including a synchronization pattern, a second mode in which said first transmitter sends frames including insufficient auxiliary data to enable said first receiver to acquire said frame synchronization in a reliable fashion but, by virtue of a knowledge of said frame synchronization acquired previously, in said first mode, enabling loss of frame synchronization to be determined, loss of frame synchronization by said first receiver being signalled to said first transmitter by a second transmitter (15) changing from said second transmission mode to said first transmission mode and by a second receiver (16) detecting said change of transmission mode, and said second transmitter transmitting in said second mode modified frames including no payload data sequence imitating the synchronization pattern of the first mode.

36 Claims, 7 Drawing Sheets

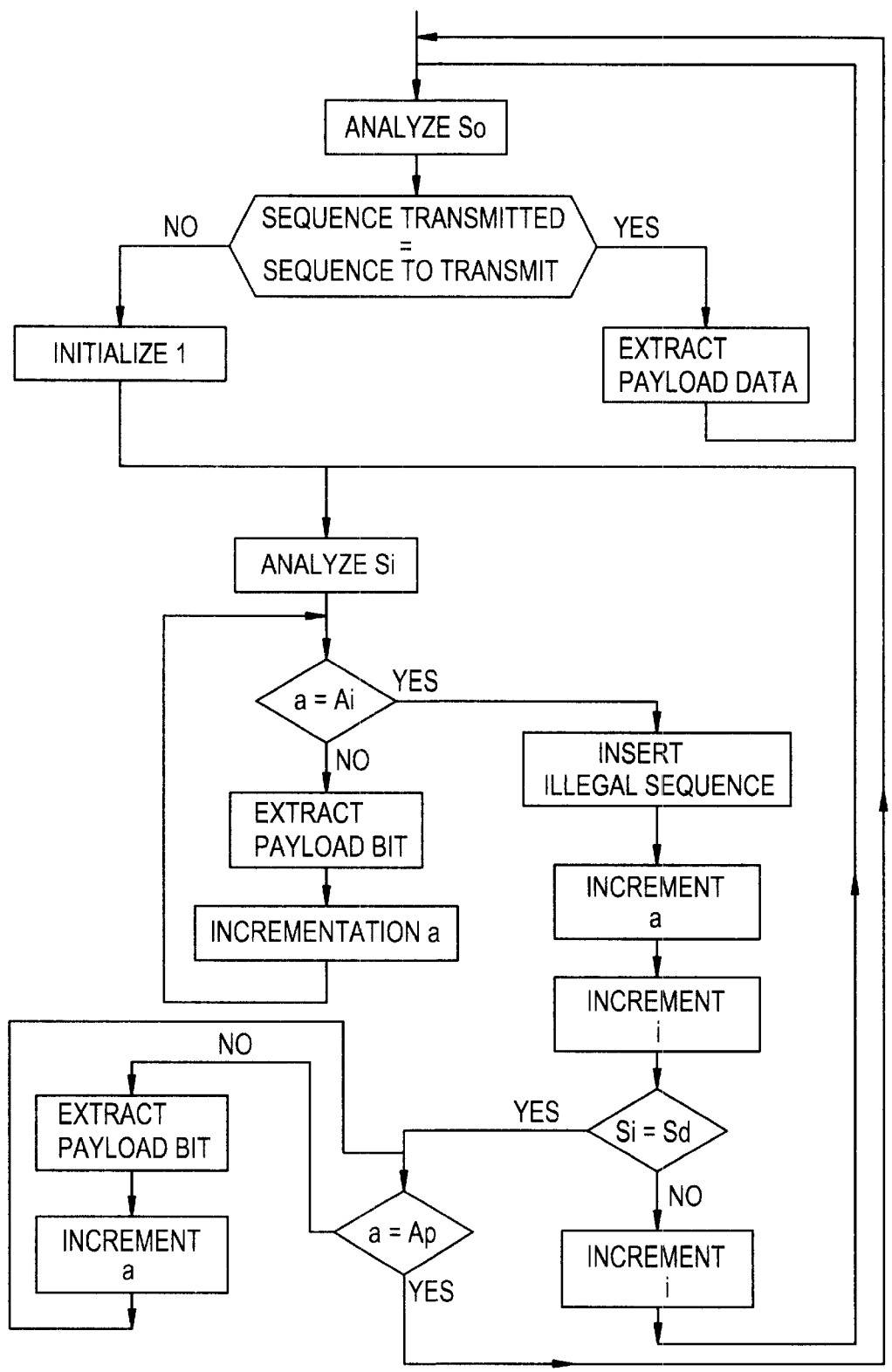

METHOD AND DEVICE FOR TRANSMITTING DATA FRAMES

The present invention concerns data transmission techniques, in particular data transmission techniques in which the transmitted data is structured in blocks known as frames comprising payload data and data referred to herein as auxiliary data enabling frame synchronization of a receiver to a transmitter.

Auxiliary data of the above kind generally includes a synchronization pattern (flag) formed of a predetermined sequence of bits usually placed at the head of the frame.

Because it is necessary to guard against the payload data imitating the synchronization pattern, auxiliary data of the above kind usually further comprises synchronization bits intended to prevent such imitation interleaved with the payload data: if the synchronization pattern is a sequence of eight bits at 0, for example, bits at 1 are inserted every seven bits.

However, inserting auxiliary data of the above kind is clearly to the detriment of the payload data, which therefore raises a problem of frame efficiency, especially if it is required to increase the transmitted payload without increasing the bit rate.

To this end, the present invention consists in method of transmitting data frames including payload data and auxiliary data enabling frame synchronization of a receiver to a transmitter, said method being essentially characterized in that:

it has two transmission modes:
  a first mode used on initialization or in the event of loss of frame synchronization by a receiver referred to as a first receiver whereby a transmitter referred to as a first transmitter sends to said first receiver frames including sufficient auxiliary data to enable said first receiver to acquire said frame synchronization in a reliable fashion, said auxiliary data including a synchronization pattern,
  a second mode used otherwise whereby said first transmitter sends frames including insufficient auxiliary data to enable said first receiver to acquire said frame synchronization in a reliable fashion but, by virtue of knowledge of said frame synchronization acquired previously, in said first mode, enabling loss of frame synchronization to be determined, loss of frame synchronization by said first receiver is signalled to said first transmitter by a second transmitter associated with said first receiver in a common transmission equipment changing from said second transmission mode to said first transmission mode and detection of said change of transmission mode by a second receiver associated with said first transmitter in the same transmission equipment, and said second transmitter transmits modified frames in said second mode including no payload data sequence imitating the synchronization pattern of the first mode, also referred to as illegal sequences, which are replaced by substitution data enabling the receiver to insert said illegal sequences into the received payload data.

Accordingly, in the event of initialization or of loss of synchronization, the first transmission mode is used to enable the receiver to acquire frame synchronization in a reliable manner and other than in either of the above two cases the second transmission mode is used so that the payload transported can be increased, the system reverting to the first mode as soon as loss of synchronization is detected in the second mode.

Furthermore, any problem due to a risk of erroneous detection of this change from the second mode to the first mode itself due to a risk of imitation of the synchronization pattern of the first mode by the payload data transmitted in the second mode is avoided by the transmission of said modified frames in the second mode.

The present invention also consists in a corresponding transmission device.

The present invention also consists in a modified frame of the above kind.

The present invention is applicable to frames like V110 frames for transporting data at bit rates that are not sub-multiples of 64 kbit/s, for example those obtained for the data transmission services offered by the GSM (Global System for Mobile Communications) network, in 64 kbit/s channels.

Other aims and features of the present invention will become apparent on reading the following description of embodiments of the invention given with reference to the accompanying,/drawings, in which:

FIG. 1 is a diagram illustrating one example of a frame transmitted in said first mode, FIG. 2 is a diagram illustrating a first example of a frame transmitted in said second mode, FIG. 3 is a diagram illustrating a second example of a frame transmitted in said second mode, FIG. 4 is a block diagram explaining the principle of transmission using said first and second transmission modes, for simplicity in the case of a unidirectional link, FIG. 5 is a block diagram illustrating a transmission device using said first and second transmission modes in the case of a bidirectional link, FIG. 6 is a diagram illustrating one example of a payload data sequence to be transmitted used to explain the principle of forming said modified frames, FIGS. 7, 8 and 9 are diagrams respectively illustrating first, second and third examples of a modified frame enabling the transmission of a payload data sequence of the above kind, FIG. 10 is a diagram illustrating one example of the content of substitution sequences transmitted in a modified frame of the above kind, FIG. 11 is a diagram illustrating a method of producing modified frames in accordance with said first example or in accordance with said second example from an incoming payload data stream, FIG. 12 is a diagram illustrating a method of producing modified frames in accordance with said third example from an incoming payload data stream.

FIG. 14 is a diagram illustrating a method of extracting a payload data stream from modified frames received in accordance with said second example or in accordance with said third example.

Figure 1:
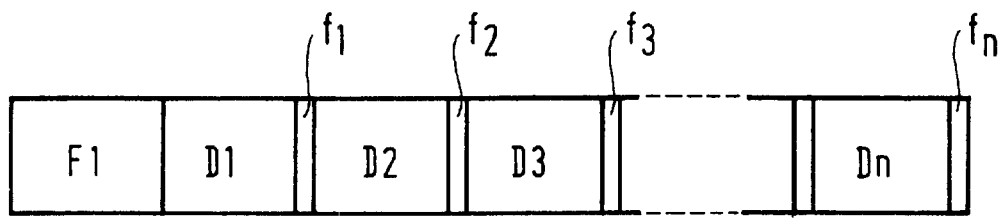

In the example of a frame transmitted in said first mode illustrated in FIG. 1, said auxiliary data includes a synchronization pattern referred to as the first synchronization pattern F1 formed of a predetermined sequence of bits which here are at the head of the frame and of synchronization bits f1, f2, . . . , fn, interleaved with the payload data D1, D2, . . . , Dn and intended to prevent imitation of the synchronization pattern by the payload data.

Figure 2:
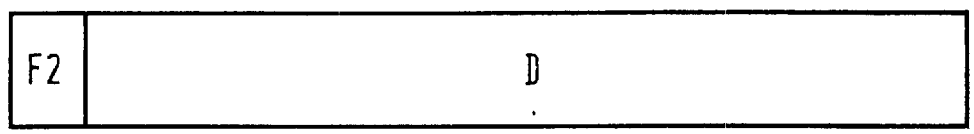

In the example of a frame transmitted in said second mode illustrated in FIG. 2, said auxiliary data includes only one synchronization pattern referred to as the second synchronization pattern F2 which has a length different than (in particular less than) that of the first synchronization pattern F1.

Figure 3:

In the example of a frame transmitted in said second mode illustrated in FIG. 3, said auxiliary data includes only error correcting code data C obtained by applying a block code error correcting code to the payload data to be transmitted inside the same block or frame.

Note that in this last example said auxiliary data further protects the payload data transmitted in this way against transmission errors.

Examples of frames other than those illustrated by FIGS. 1 through 3 are naturally possible; also, frames transmitted in said second mode can be obtained using, as the auxiliary data, both a synchronization pattern and error correcting code data, possibly shorter in length than those respectively used in the embodiments illustrated by FIGS. 2 and 3.

In the various examples, the auxiliary data of frames transmitted in said first mode enables the receiver to acquire frame synchronization in a reliable fashion and the auxiliary data of frames transmitted in said second mode is insufficient to enable the receiver to acquire such synchronization in a reliable fashion. Nevertheless, by virtue of a knowledge of said frame synchronization acquired beforehand, in said first mode, it enables loss of frame synchronization to be detected.

Furthermore, to speed up the return to frame synchronization of the receiver in the event of loss of such synchronization, the frames transmitted in said first mode can include bits having the same value as the synchronization bits instead of payload data.

Figure 4:
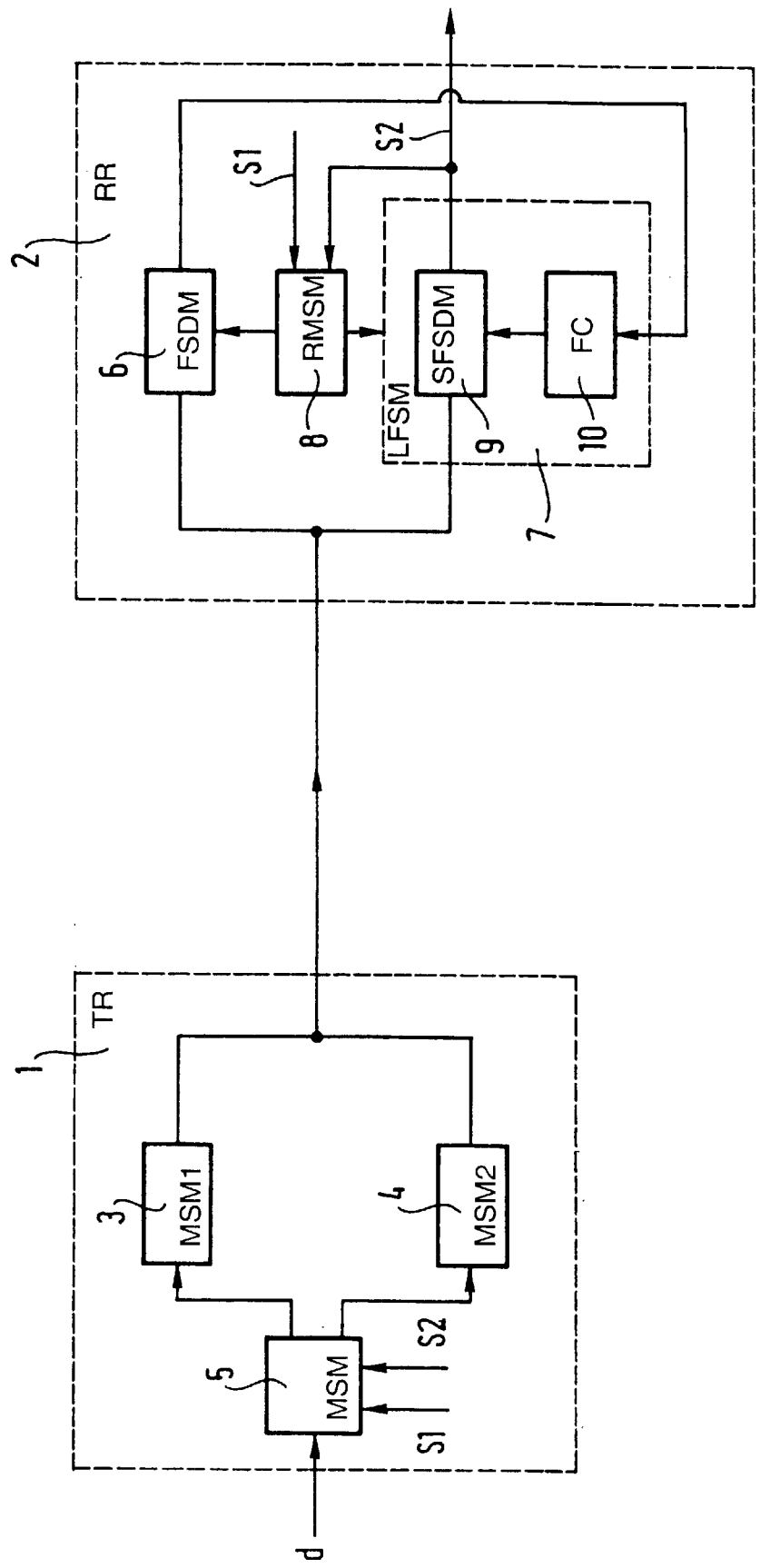

The device shown in FIG. 4 is used to transfer data frames between a transmitter 1 (TR) and a receiver 2 (RR).

The transmitter 1 includes means 3 for sending frames in said first mode, means 4 for sending frames in said second mode (MSM2) and sending mode selector means 5 (MSM) for selecting one or other of the means 3 or 4, as appropriate, in the present instance to feed incoming payload data "d" to one or other of the aforesaid means, as appropriate.

In addition to conventional means not referred to here because they are not directly relevant to the invention for restoring the transmitted payload data, the receiver 2 includes means 6 for detecting frame synchronization (FSDM) in the first mode, means 7 for detecting loss of frame synchronization (LSFM) in the second mode and receive mode selector means 8 for selecting one or other of the aforesaid means, as appropriate.

The means 6 for detecting frame synchronization in the first mode use techniques known in themselves to observe the received data through a sliding window and to determine if the synchronization pattern F1 has been found or not for each position of the sliding window.

The means 7 for detecting loss of frame synchronization in the second mode include simplified frame synchronization detector means 9 (SFSDM) activated by a frame clock 10 (FC) locked onto a position depending on knowledge previously acquired of said frame synchronization, this prior knowledge being in this instance supplied by the first mode frame synchronization detector means 6. The simplified frame synchronization detector means 9 are simplified in the sense that, unlike the frame synchronization detector means 6, they do not observe the received data through a sliding window but instead through a single window the position of which is therefore determined by said previously acquired knowledge of frame synchronization.

For example, in the case of the second transmission mode shown in FIG. 2, the simplified synchronization detector means 9 include means for determining to what extent the sequence of data selected by means of said single window corresponds to the synchronization pattern F2.

In the case of the second transmission mode shown in FIG. 3 the simplified synchronization means 9 include means for determining to what degree the data obtained by applying the same block code as on transmission to the payload data forming a received frame delimited in this way by virtue of the position of said observation window corresponds to the error correcting code data produced by the transmitter.

The send mode selector means 5 shown in FIG. 4 receive a signal S1 that can indicate initialization of the transmission procedure and a signal S2 that can indicate loss of frame synchronization by the receiver. The selector means 5 select the means 3 for sending frames in said first mode if the signal S1 indicates initialization or if the signal S2 indicates loss of frame synchronization by the receiver or the means 4 for sending frames in said second mode otherwise.

The receive mode selector means 8 receive the signal S1 that can indicate initialization of the transmission procedure and the signal S2 that can indicate detection of loss of synchronization, the latter coming in this instance directly from the second mode frame synchronization loss detector means 7. The selector means 8 select the first mode frame synchronization detector means 6 if the signal S1 indicates initialization or if the signal S2 indicates loss of synchronization or the loss of synchronization detector means 7 otherwise.

Accordingly, the first transmission mode is used to enable the receiver to acquire frame synchronization in a reliable fashion in the event of initialization or of loss or synchronization and the second transmission mode is used otherwise, so enabling the payload transported to be increased, the system returning to the first mode as soon as loss of synchronization is detected in the second mode.

Figure 5:
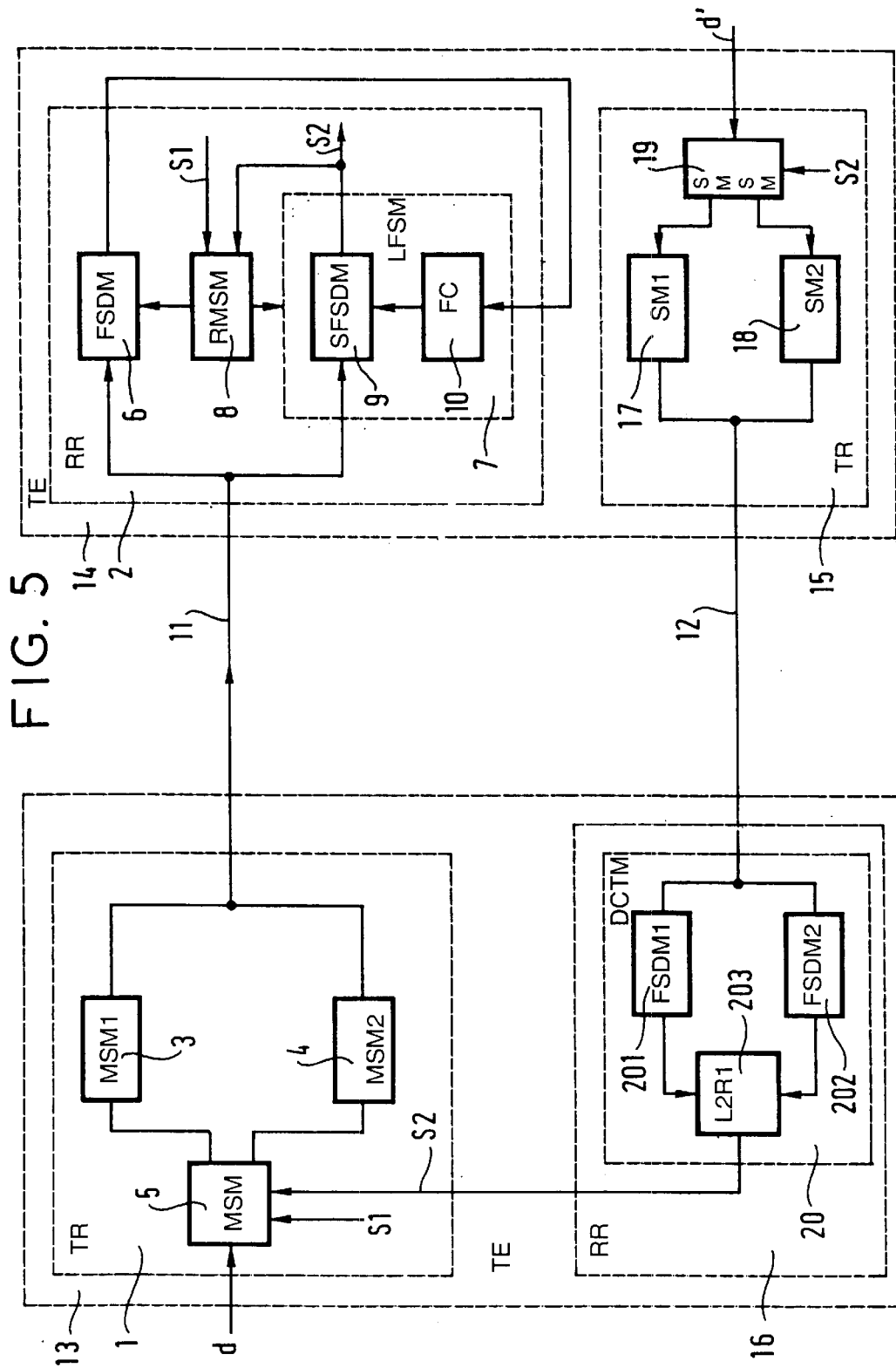

The FIG. 5 diagram shows how the loss of synchronization information carried by the signal S2 is fed from the receiver to the transmitter in the case of bidirectional transmission, schematically represented in the form of two unidirectional links 11 and 12. For simplicity, items common to FIG. 4 and to FIG. 5 have the same reference symbols. Like the link from FIG. 4, the link 11 connects a transmitter 1, referred to in this context as the first transmitter, of transmission equipment 13 (TE) to a receiver 2, referred to here as the first receiver, of transmission equipment 14. Likewise the link 2 connects a transmitter 15, here called the second transmitter, of the transmission equipment 14 to a receiver 16, here called the second receiver, of the transmission equipment 13.

To feed the loss of synchronization information carried by the signal S2 from the receiver 2 to the transmitter 1 the second transmitter 15 includes means 17 (SM1) for sending frames in said first mode, means 18 (SM2) for sending frames in said second mode and send mode selector means 19 (SMSM) for selecting one or other of the aforementioned means, as appropriate, here for applying incoming payload data "d'" to one or other of said means, as appropriate.

In addition to means not specifically shown for restoring the transmitted payload data, the second receiver 16 includes means 20 for detecting a change in the mode of transmitting frames (DTFM) sent by the transmitter 15 from the second mode to the first mode.

The signal S2 fed to the transmitter 1 comes from the means 20 for detecting a change in the mode of transmitting frames sent by the transmitter 15, the means 17 for sending frames in said first mode being selected in said transmitter 15 if the signal S2 from the receiver 2 indicates detection of loss of synchronization.

The means 20 for detecting a change in the mode of transmission (DCTM) include, operating in parallel:

first mode frame synchronization detector means 201 (FSDM1) employing techniques known in themselves to observe the data received through a sliding window and to determine, for each position of said sliding window, whether the first mode synchronization pattern has been found or not, and second mode frame synchronization loss detector means 202 (FSDM2) which can include, like the means 7, simplified frame synchronization detector means activated by a frame clock locked onto a position depending on a knowledge of said frame synchronization previously acquired in the first mode.

Accordingly, if either of the following two conditions is satisfied: loss of synchronization in the second mode (detected by the means 202), or re-acquisition of synchronization in the first mode (detected by the means 201), as indicated by the means 203 (L2R1), the means 20 detect a change of mode.

Note that even if, for simplicity, the foregoing description refers only to the units needed to transmit data "d" from the transmission equipment 13 to the transmission equipment 14, the transmission principle is of course symmetrical and applies equally for transmission of data "d'" from the transmission equipment 14 to the transmission equipment 13.

Problems arising from the risk of erroneous detection of this change from the second mode to the first mode due to the risk of imitation of the first mode synchronization pattern by the payload data transmitted in the second mode are avoided, as will now be explained with reference to the subsequent figures of the accompanying drawings, in which the frames concerned are second mode frames unless otherwise specified.

Figure 6:
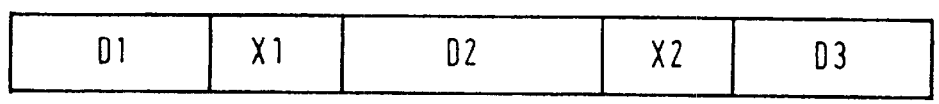

As shown in FIG. 6, a sequence of payload data to be transmitted can always be broken down into sequences, referred to herein as authorized sequences, that do not themselves contain any sequence imitating the synchronization pattern and sequences, referred to herein as illegal sequences, imitating the synchronization pattern. FIG. 6 shows a sequence of payload data of the above kind divided into three authorized sequences D1, D2, D3, and into two illegal sequences X1, X2, for example, said payload data sequence here including, in this order, the sequences D1, X1, D2, X2, D3.

Figure 7:
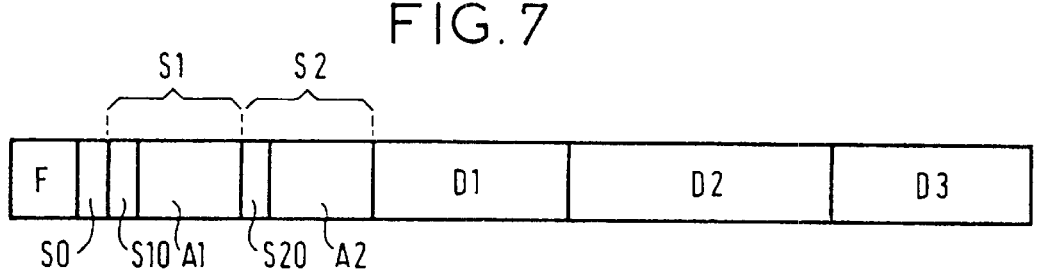
Figure 8:
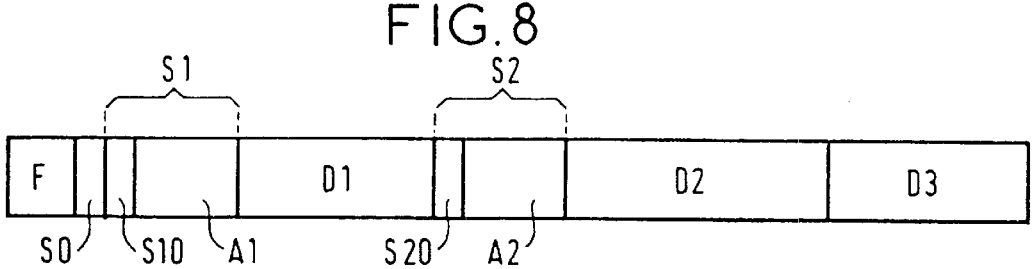
Figure 9:
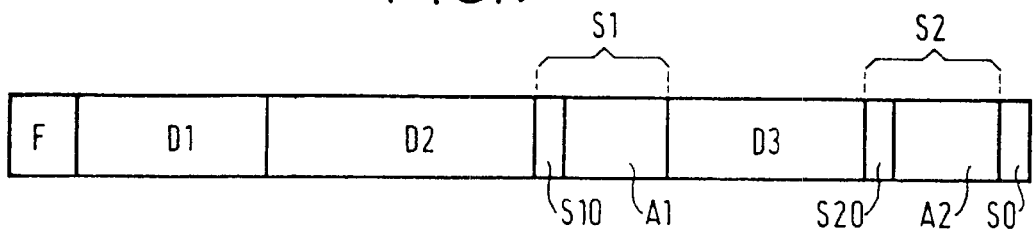

As shown in FIGS. 7 to 9 the modified frame in accordance with the invention enabling a payload data sequence of the above kind to be transmitted does not include any illegal sequence such as sequence X1 or X2 but to the contrary includes so-called substitution data enabling the illegal sequences to be put back into the received payload data at the receiver.

The substitution data advantageously comprises data of two types:

data referred to herein as operating data, enabling equipment receiving these modified frames to determine to what degree the transmitted payload data sequence differs from the payload data sequence to be transmitted, that is to say the degree to which illegal sequences are present in the sequence of payload data to be transmitted, and data referred to herein as address data, enabling equipment receiving these modified frames to determine more precisely the location or locations where an illegal sequence must be inserted into the received payload data.

In the example shown said address data A1 and A2 is contained in substitution sequences S1 and S2 which are respectively substituted for the illegal sequences X1 and X2 (also referred to as substituted sequences). Thus the substitution sequence S1 contains an address A1 which in the example shown enables an equipment receiving such modified frames to insert the illegal sequence X1 between the received sequences corresponding to the authorized sequences (non-substituted sequences) D1 and D2 and the substitution sequence S1 therefore contains an address A2 enabling the receiver to insert the illegal sequence X2 between the received sequences corresponding to the authorized (non-substituted) sequences D2 and D3.

By way of example, said operating data can include:

first operating data S0 (FIGS. 7 through 9) transmitted at a particular location after the synchronization pattern concerned, i.e. pattern F2 (for example immediately after that synchronization pattern), and indicating if the transmitted payload data sequence differs or not from the payload data sequence to be transmitted, that is to say whether the transmitted payload data sequence contains substituted sequences or not, second operating data S10 and S20 (FIGS. 7 through 9) advantageously transmitted in said substitution sequences S1 and S2 and indicating if each of said substitution sequences is the last of the transmitted frame or not.

In another example, not specifically illustrated, said operating data could also include the number (possibly 0) of substituted sequences contained in the transmitted payload data sequence.

Figure 10:
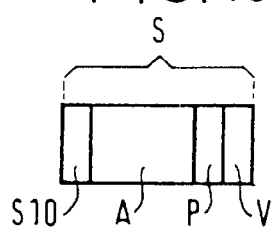

FIG. 10 is a diagram illustrating one example of the content of a substitution sequence.

In this example a substitution sequence S includes:

said second operating data S10, for example, consisting for example of a bit at 1 or 0 according to whether the substitution sequence concerned is the last in the transmitted frame or not, address data A1 or A2 consisting, for example, of a binary number on "n" bits indicating the rank of a bit in a sequence of $2^n$ payload bits to be transmitted, data P protecting the substitution sequence against transmission errors (the protection data consisting of a parity bit, for example), and locking data V to prevent an illegal sequence being reproduced by inserting a substitution sequence into the frame transmitted (the locking data comprising a bit at 1, for example, in the example considered here of an illegal sequence made up only of bits at 0).

In the example illustrated by FIG. 7 the combination of the operating data and the address data (i.e. the combination of the first operating data S0 and the substitution sequences S1, S2 in turn including second operating data S10 and S20 and address data A1 and A2) is transmitted before the payload data.

This example is also more particularly suited to the situation in which the time-delay after which the payload bits are extracted from a frame of the above kind at the receiver may not be fixed, the time-delay in this example essentially being variable and depending on the number of sequences present in the frame, which can be unacceptable in some applications, for example the application previously mentioned to transmission within infrastructures of a mobile radio network such as the GSM network.

This is avoided in the example illustrated by FIG. 8.

To be more precise, in that example, the first substitution sequence S1 is transmitted at a particular location after the first operating data S0 in turn transmitted at a particular location after the synchronization pattern F2 (for example, the first substitution sequence S1 is transmitted immediately after the first operating data S0 which is transmitted immediately after the synchronization pattern F2) and the second substitution sequence S2 is transmitted instead of the first substituted sequence X1 (or, more generally, the nth substitution sequence would be transmitted instead of (n−1)th substituted sequence).

The examples illustrated by FIGS. 7 and 8 are more particularly suited to the situation in which there is no constraint in respect of the time-delay after which such frames can be produced in this way from an incoming payload data stream, the time-delay in these examples being equal to the total time to analyze an incoming payload data sequence, which is necessary if said operating data is to be obtained, and which can be prohibitive in some applications and in particular in the previously mentioned application to transmission of data within infrastructures of a mobile radio network such as the GSM network in particular.

The example illustrated by FIG. 9 can satisfy a constraint of the above kind, however. In this example said operating data is inverted relatively to that shown in FIGS. 7 and 8, in the sense that:

the first operating data S0 indicating if the transmitted payload data sequence differs or does not differ from the payload data sequence to be transmitted is not inserted after the synchronization pattern of the frame concerned, but at the end of the frame, i.e. before the synchronization pattern of the next frame, and the second operating data S10 and S20 no longer indicates if the corresponding substitution sequence S1 and S2 is the last from the start of the frame or not, but instead whether it is the last from the end of the frame or not.

Note that a frame of the above kind then cannot be processed by the receiver before it has been received completely, but that this does not introduce any significant time-delay, unlike the analysis time that would otherwise have been required at the transmitter.

Figure 12:
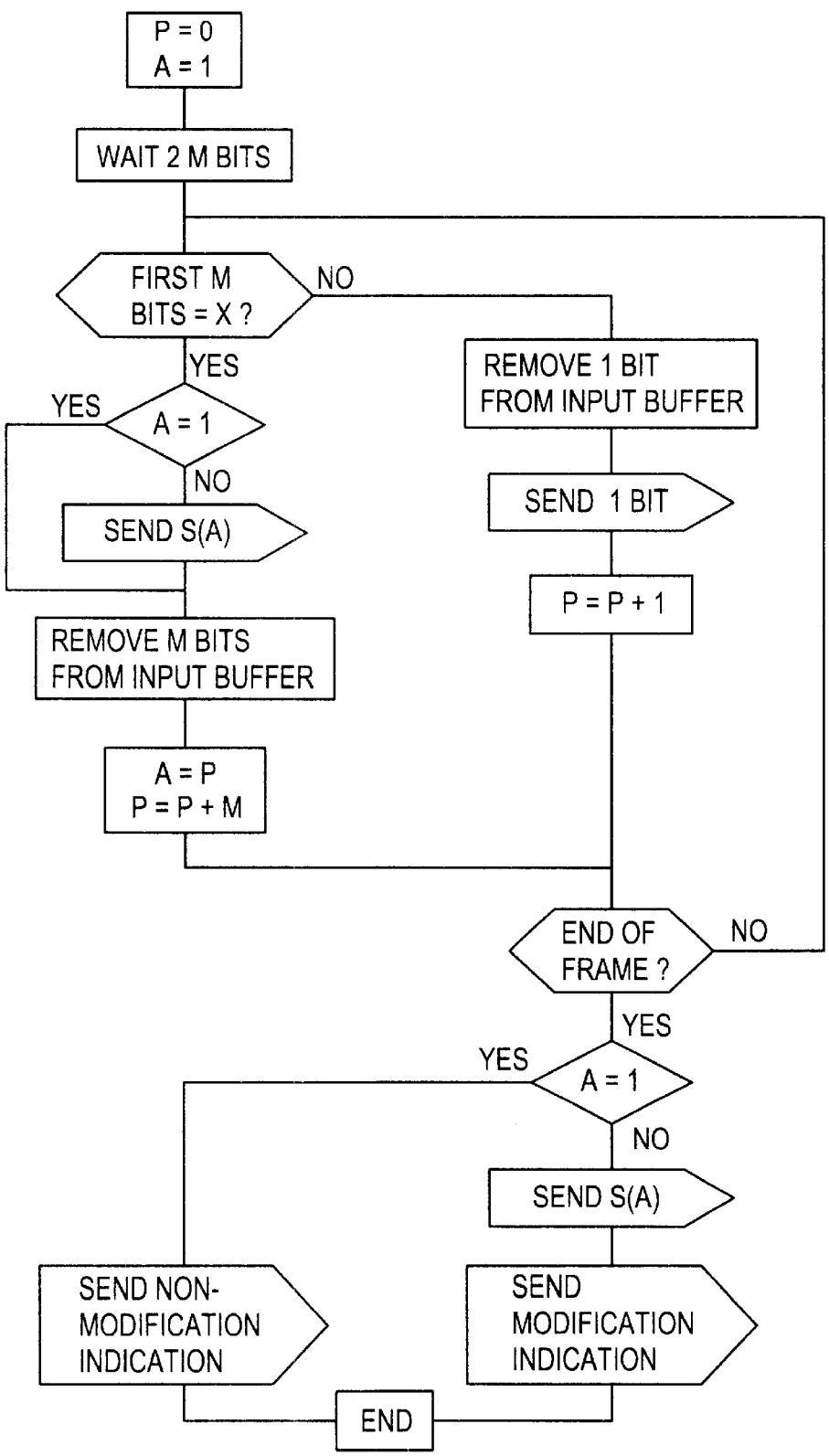

Furthermore, it is necessary to begin analyzing said sequence of payload data to be transmitted before it is possible to produce a corresponding frame, whence a short time-delay in the transmission of such frames, as shown in FIG. 12.

Also, in the example shown, the second (i.e. here the last) substitution sequence S2 is transmitted at a particular location before the first operating data S0 which is transmitted at a particular location before the synchronization pattern of the next frame (for example the last substitution sequence is transmitted immediately before the first operating data S0 which is transmitted immediately before the synchronization pattern F2 of the next frame), and the first substitution sequence S1 is transmitted instead of the second (i.e. here the last) substituted sequence X2 (or more generally the (n−1)th substitution sequence would be transmitted in place of the nth substituted sequence).

Figure 11:
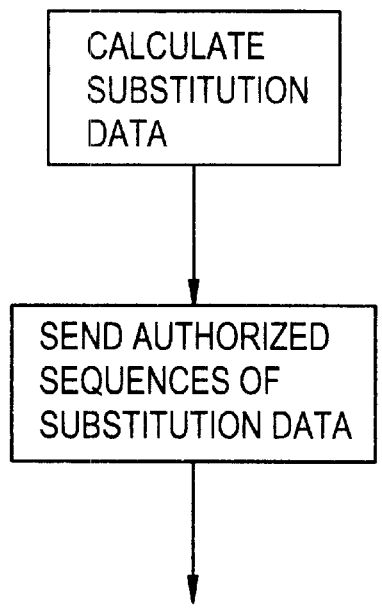

FIG. 11 is a diagram illustrating a method of producing modified frames of the above kind that is equally valid for the FIG. 7 example and for the FIG. 8 example.

The method includes the following steps:
calculating substitution data from incoming payload data, and
sending substitution data calculated in this way and authorized sequences in the required order.

FIG. 12 shows an algorithm illustrating one method of producing modified frames of the above kind in the example illustrated by FIG. 9 from an incoming payload data stream.

The method includes the following steps for producing the payload of each frame to be transmitted:

initializing to a value equal to zero a variable P corresponding to a current address,
initializing a variable A to a value corresponding to an impossible address value, for example equal to −1,
waiting to receive 2M bits of the incoming stream (where M denotes the number of bits in the synchronization pattern) in an input buffer register,
detecting if the first M bits received stored in the input buffer register correspond to an illegal sequence X:
if an illegal sequence is detected:
if the variable A is equal to said impossible value:
removing said M first bits received from the input buffer register,
reinitializing the variable A to the value of the variable P,
incrementing the variable P by a value equal to M,
detecting if the current address corresponds to an end of frame:
if an end of frame is detected:
if A is not equal to said impossible value:
sending the substitution sequence S(A) corresponding to an illegal sequence to be inserted, at the receiver, at the address A, and then sending first operating data S0 indicating the presence of substitution sequencers) in the frame (indicated by "send modification indication"), and returning to the beginning of the algorithm,
if A is equal to said impossible value, sending first operating data S0 indicating absence of substitution sequence(s) in the frame (indicated by "send non-modification indication") and then returning to the beginning of the algorithm,
if no end of frame is detected:
returning to the illegal sequence detecting step,
if A is not equal to said impossible value: sending the substitution sequence S(A),
if no illegal sequence is detected:
removing the first bit received from the buffer register,
sending that bit,
incrementing the variable P by 1,
returning to the end of frame detection step.

Thus a method of producing frames in accordance with either FIG. 11 or FIG. 12 is used in the means 18 from FIG. 5 for sending frames in said second mode.

The present invention also consists in a device for sending modified frames of the above kind, the device including means for implementing the various steps of the sending processes described.

As implementing such means will not represent any particular problem to the skilled person, they will not be described in more detail than stating their function. Generally, a device of the above kind includes:
means for calculating substitution data from incoming payload data, and
means for sending payload data containing no illegal sequences and substitution data calculated as above for forming said frame.

Figure 13:
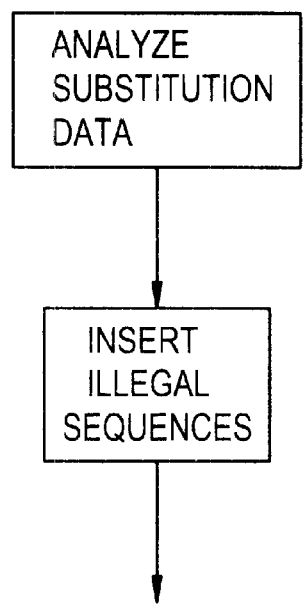
FIG. 13 is a diagram illustrating a method of extracting payload data.

FIG. 13 is a diagram illustrating a method of extracting payload data from received frames in the case of the FIG. 7 example.

The method includes the steps of:
analyzing substitution data, and
inserting illegal sequences into the received payload data in the manner determined by analyzing said substitution data.

FIG. 14 is a diagram illustrating a method of extracting a payload data stream from received frames valid for the example illustrated by FIG. 8 and, subject to modifications indicated below, the example illustrated by FIG. 9.

The method includes the following steps, each time a synchronization pattern is detected:

initializing a variable "a" corresponding to a current address, analyzing first operating data S0 in accordance with the detected synchronization pattern and indicating if the transmitted payload data sequence differs from the payload data sequence to be transmitted or not:

if the payload data sequence transmitted does not differ from the payload data sequence to be transmitted, extracting said transmitted payload data to form the outgoing payload data stream, if the payload data sequence transmitted differs from the payload data sequence to be transmitted:

analyzing the first substitution sequence S1 in accordance with the first operating data S0 to determine the address A1 at which to insert the first illegal sequence, i.e. in the present context also the address of the second substitution sequence S2, and to determine from the operating data S10 contained in said substitution sequence S1 whether that substitution sequence is the last of the frame or not, comparing the current address "a" and the address A1:

while "a" is less than A1, extracting the payload data bit at the current address to form said outgoing payload data stream and then correspondingly incrementing the current address "a" and returning to the step of comparing the current address "a" and the address A1, if "a" is equal to A1, inserting an illegal sequence to form said outgoing payload data stream and then correspondingly incrementing the current address "a", in parallel with the above, if the substitution sequence S1 is not the last one of the frame, analyzing the second substitution sequence S2 at the address A1 to determine the address A2 at which to insert the second illegal sequence (i.e. also the address of any substitution sequence S3) and for determining, from the operating data S20 contained in the substitution sequence S2, whether that substitution sequence is the last of the frame or not, while "a" is less than A2, extracting the payload data bit at the current address to form said outgoing payload data stream and then correspondingly incrementing the current address "a" and returning to the step of comparing the current address "a" and the address A2, if "a" is equal to A2, inserting an illegal sequence to form said outgoing payload data stream and then correspondingly incrementing the current address "a", and so on, up to the last sequence Sd of the received frame symbolized in FIG. 9 by a loop in which an index i is varied until Si becomes equal to Sd, in which case:

while "a" is less than the address Ap of the last payload bit of the incoming frame, extracting the payload data bit at the current address to form said outgoing payload data stream and then correspondingly incrementing the current address, and if "a" is equal to Ap returning to the start of the algorithm.

The same process holds good for received frames in the case of the example illustrated by FIG. 9 provided that the synchronization pattern to be detected is considered to be that of the next frame and provided that the order in which the substitution sequences are analyzed is reversed, as explained in connection with FIG. 9.

A method of extracting payload data in accordance with either FIG. 13 or FIG. 14 is therefore used in the FIG. 5 process to extract payload data in the second receiver 16.

The present invention also consists in a device for receiving modified frames of the above kind, the device including means for implementing the various steps of the receive processes described.

As implementing such means will not represent any particular problem to the skilled person, they will not be described in more detail than stating their function. Generally, a device of the above kind includes:

means for analyzing substitution data of incoming frames, and means for inserting illegal sequences into the payload data extracted from said incoming frames at locations obtained by analyzing said substitution data to form said outgoing payload data streams.

What is claimed is:

1. A method of transmitting data frames including payload data and auxiliary data enabling frame synchronization of a receiver to a transmitter, said method comprising:

on initialization or in the event of loss of frame synchronization by a first receiver, using a first transmission mode, including sending, from a first transmitter to said first receiver, frames including sufficient auxiliary data to enable said first receiver to acquire said frame synchronization in a reliable fashion, said auxiliary data including a synchronization pattern;

otherwise, using a second transmission mode whereby said first transmitter sends frames including insufficient auxiliary data to enable said first receiver to acquire said frame synchronization in a reliable fashion but, by virtue of knowledge of said frame synchronization acquired previously, in said first mode, enabling loss of frame synchronization to be determined.

2. A method according to claim 1, wherein the auxiliary data of frames transmitted in said first mode include a synchronization pattern and synchronization bits inserted in the payload data to be transmitted and intended to prevent imitation of said synchronization pattern within said payload data.

3. A method according to claim 1, wherein the auxiliary data of frames transmitted in said second mode includes only one synchronization pattern with a length different from the length of the synchronization pattern of frames transmitted in the first mode.

4. A method according to claim 1, wherein the auxiliary data of frames transmitted in said second mode include only error correcting code data obtained by applying an error correcting code of the block code type to the payload data to be transmitted in said frames.

5. A method according to claim 1, further comprising:

calculating substitution data from incoming payload data, and sending payload data not including any illegal sequences and substitution data calculated according to said calculating step for forming said modified frames from said incoming payload data stream.

6. A method according to claim 5, wherein said calculation of substitution data necessitates an analysis of said incoming payload data over a sufficient length to enable calculation of all the substitution data of a frame before the first payload bit of that frame is sent.

7. A method according to claim 5, wherein said calculation of substitution data necessitates an analysis of said incoming payload data over a length less than that necessary to enable calculation of all the substitution data of a frame before sending the first payload bit of that frame.

8. A device for transmitting data frames, including payload data and auxiliary data adapted to enable frame synchronization, by a receiver to a transmitter, said device comprising:

means for transmitting in a first mode used, on initialization or in the event of loss of frame synchronization, by a first receiver, whereby a first transmitter sends to said first receiver frames including sufficient auxiliary data to enable said first receiver to acquire said frame synchronization in a reliable fashion, means for transmitting in a second mode used, otherwise, whereby said first transmitter sends frames including insufficient auxiliary data to enable said first receiver to acquire said frame synchronization in a reliable fashion but, by virtue of a knowledge of said frame synchronization acquired previously, in said first mode, enabling loss of frame synchronization to be determined.

9. A device according to claim 8 characterized in that:

said first transmitter includes means for sending frames in said first mode, means for sending frames in said second mode and sending mode selector means for selecting one or other of said means, as appropriate, said first receiver includes first mode frame synchronization detector means, second mode frame synchronization loss detector means and receive mode selector means for selecting one or other of said means, as appropriate, said second transmitter includes means for sending frames in said first mode, means for sending frames in said second mode and sending mode selector means for selecting one or other of said means, as appropriate, and said second receiver includes means for detecting a change from said second mode to said first mode.

10. A device according to claim 9 wherein said second mode frame synchronization loss detector means include simplified synchronization detection means activated by a frame clock locked onto a position depending on said previously acquired knowledge of frame synchronization.

11. A device according to claim 9, further comprising:

means for calculating substitution data from an incoming payload data, and means for sending payload data containing no illegal sequences and substitution data calculated by said means for calculating to form modified frames from said incoming payload data stream.

12. A device according to claim 9, further comprising:

means for analyzing incoming frame substitution data, and means for inserting illegal sequences into the payload data extracted from said incoming frames, at locations obtained by analyzing said substitution data, to form said payload data stream;

whereby the payload data stream is extracted from the modified frames.

13. A method according to claim 1, further comprising, in each of said modified frames for transmitting data in said second mode, ensuring the absence of any payload data sequence imitating the synchronization pattern of said first mode, also referred to as illegal sequences, by using substitution data to enable said illegal sequences to be inserted into the payload data received at the receiver.

14. A method according to claim 13, wherein said substitution data includes data of two types:

operating data enabling the degree, to which illegal sequences are present in the payload data sequence to be transmitted at the receiver, to be determined, and address data enabling more precise determination of the location or locations at which an illegal sequence must be inserted into the payload data received at the receiver.

15. A method according to claim 14, wherein said substitution data includes:

first operating data indicating whether the payload data sequence to be transmitted contains illegal sequences, and a substitution sequence substituted for each illegal sequence and containing the address at which to insert said illegal sequence and second operating data indicating whether said substitution sequence is the last of the transmitted frame.

16. A method according to claim 15, wherein said substitution sequences further include data to protect said substitution sequences against transmission errors.

17. A method according to claim 15 wherein said substitution sequences farther include:

locking data to prevent an illegal sequence being reproduced by inserting a substitution sequence into the frame transmitted.

18. A method according to claim 15 wherein the first substitution sequence is transmitted after said first operating data which is transmitted after the synchronization pattern and in that the nth substitution sequence is transmitted instead of the (n−1)th illegal sequence.

19. A method according to claim 15 wherein:

said first operating data is not inserted after the synchronization pattern of the frame concerned but before the synchronization pattern of the next frame, and said second operating data does not indicate if the corresponding substitution sequence is the last from the beginning of the frame or not but instead if it is the last from the end of the frame or not.

20. A method according to claim 19 wherein the last substitution sequence is transmitted before said first operating data which is transmitted before the synchronization pattern of the next frame and in that the (n−1)th substitution sequence is transmitted instead of nth substituted sequence.

21. A method according to claim 13 wherein said substitution data is all transmitted.

22. A data frame transmission method, comprising:

transmitting, upon initialization or in the event of receipt of a signal indicating loss of data frame synchronization, a first frame containing payload data and auxiliary data, said auxiliary data including a synchronization pattern;

assembling a modified frame based on inputted payload data, said modified frame containing payload data and auxiliary data free of said synchronization pattern, by checking said payload data for an illegal data sequence, said illegal data sequence being a data sequence that imitates said synchronization pattern of said first frame, and upon detection of said illegal data sequence generating substitution data and substituting substitution data for said illegal data sequence; and transmitting said modified frame to said receiver in all cases of transmission other than those in which said first frame is transmitted.

23. A computer-readable medium incorporating program instructions enabling a processor to:

transmit, upon initialization or in the event of receipt of a signal indicating loss of data frame synchronization, a first frame containing payload data and auxiliary data, said auxiliary data including a synchronization pattern;

assemble a modified frame based on inputted payload data, said modified frame containing payload data and auxiliary data free of said frame synchronization pattern, by checking said payload data for an illegal data sequence, said illegal data sequence being a data sequence that imitates said synchronization pattern of said first frame, and upon detection of said illegal data sequence generating substitution data and substituting substitution data for said illegal data sequence; and transmit said modified frame to said receiver in all cases of transmission other than those in which said first frame is transmitted.

24. A data frame transmission system, comprising:

a data transmitter configured to transmit, upon initialization or in the event of receipt of a signal indicating loss of data frame synchronization, a first frame containing payload data and auxiliary data, said auxiliary data including a synchronization pattern; and a data frame assembly module configured to assemble a modified frame based on inputted payload data, said modified frame containing payload data and auxiliary data free of said frame synchronization pattern, by checking said payload data for an illegal data sequence, said illegal data sequence being a data sequence that imitates said synchronization pattern of said first frame, and upon detection of said illegal data sequence generating substitution data and substituting substitution data for said illegal data sequence, and by inputting said modified frame to said data transmitter, wherein said transmitter transmits said modified frame in all cases of transmission other than those in which said first frame is transmitted.

25. A data frame transmission system according to claim 24, further comprising:

a second data transmitter coupled to said receiver, configured to transmit a signal indicating or denying the existence of data frame synchronization; and a second receiver coupled to said data transmitter.

26. A data frame transmission method according to claim 22, further comprising generating said substitution data such that a first bit of the modified frame may be transmitted before analysis sufficient to generate all of the substituted data of said modified frame is completed on an incoming payload data stream.

27. A data frame transmission method according to claim 22, wherein said substitution data includes:

operating data indicating and/or denying that a data sequence contains substitution data; and a substitution sequence, including address data indicating a location at which to insert said illegal data sequence.

28. A data transmission method, comprising:

making a data frame synchronization determinations; and transmitting a data frame with a frame structure based upon said synchronization determination;

wherein:

when said data frame synchronization determination indicates that synchronization is required, producing a first frame, comprising payload data and a synchronization pattern; and when said determination does not indicate synchronization is required, producing a second frame free of said synchronization pattern, and including payload data.

29. The data transmission method as set forth in claim 28, wherein said producing of said second frame is performed by checking said payload data for an illegal data sequence, said illegal data sequence being a data sequence that imitates said synchronization pattern; and whenever said illegal data sequence is detected, substituting substitution data for said illegal data sequence.

30. The data transmission method as set forth in claim 29, wherein said substitution data includes address data indicating a location at which to insert said illegal data sequence.

31. The data transmission method as set forth in claim 29, wherein said substitution data includes operating data indicating whether a data sequence contains substitution data.

32. The data transmission method as set forth in claim 29, wherein said substitution data includes second operating data indicating whether a substitution data sequence is one of the first said substitution data sequence and the final said substitution data sequence in said second frame.

33. The method as set forth in claim 1, wherein said second transmitter transmits modified frames in said second transmission mode, including no payload data sequence imitating the synchronization pattern of the first mode, also referred to as illegal sequences, which are replaced by substitution data enabling the receiver to insert said illegal sequences into the received payload data.

34. The method as set forth in claim 8, wherein a means for transmitting in said second mode modifies frames including no payload data sequence imitating the synchronization pattern of the first mode, also referred to ask illegal sequences, which are replaced by substitution data enabling said illegal sequences to be inserted into the received payload data at the receiver.

35. The method according to claim 1, further comprising:

in response to a loss of frame synchronization by said first receiver: signalling said first transmitter by using a second transmitter associated with said first receiver in a common transmission equipment, and changing from said second transmission mode to said first transmission mode; and detecting said change of transmission mode using a second receiver associated with said first transmitter in the same transmission equipment.

36. The device according to claim 8, further comprising:

means for signalling, to said first transmitter, loss of frame synchronization by said first receiver, by a second transmitter associated with said first receiver in the same transmission equipment, changing from said second mode of transmission to said first mode of transmission, and means for detecting said change of transmission mode in a second receiver associated with said first transmitter in the same transmission equipment.

* * * * *